United States Patent [19]

Strasser

[11] Patent Number: 5,478,662

[45] Date of Patent: Dec. 26, 1995

[54] METHOD AND APPARATUS FOR DISPOSING OF WATER AND/OR INERT GAS FROM A FUEL CELL BLOCK

[75] Inventor: Karl Strasser, Erlangen, Germany

[73] Assignee: Siemens Aktiengesellschaft, Munich, Germany

[21] Appl. No.: 147,796

[22] Filed: Nov. 5, 1993

[30] Foreign Application Priority Data

Nov. 5, 1992 [DE] Germany .................. 42 37 411.1

[51] Int. Cl.$^6$ .............................. H01M 8/04; H01M 8/24
[52] U.S. Cl. ...................... 429/13; 429/14; 429/17; 429/23
[58] Field of Search ........................ 429/13, 17, 22, 429/23, 34, 39, 71, 72, 14, 51

[56] References Cited

U.S. PATENT DOCUMENTS

| | | |
|---|---|---|
| 3,455,743 | 7/1969 | Huebschem et al. . |
| 3,553,026 | 1/1971 | Winsel . |
| 4,317,864 | 4/1982 | Strasser . |
| 4,407,904 | 11/1983 | Uozumi et al. . |
| 4,533,607 | 8/1985 | Sederquist . |
| 4,555,452 | 11/1985 | Kahara et al. . |
| 4,593,534 | 6/1986 | Bloomfield . |

FOREIGN PATENT DOCUMENTS

| | | |
|---|---|---|
| 1187697 | 2/1965 | Germany . |
| 1596311 | 10/1970 | Germany . |
| 1671955 | 4/1972 | Germany . |
| 2729640 | 11/1979 | Germany . |
| 3604618 | 8/1987 | Germany . |
| 3732234 | 4/1989 | Germany . |
| 3832471 | 3/1990 | Germany . |
| 4004896 | 8/1991 | Germany . |
| 4113049 | 12/1991 | Germany . |
| 4106895 | 6/1992 | Germany . |
| 4132536 | 4/1993 | Germany . |
| 4095356 | 3/1992 | Japan . |
| 242992 | 4/1978 | U.S.S.R. . |
| 1223941 | 3/1971 | United Kingdom . |

OTHER PUBLICATIONS

VDT Reports, No. 912, 1992 (Strasser) "Brennstoffzelen fuer Elektrotraktion", pp. 125–145.
Fuel Cell Handbook (Appletby et al.) pp. 1–7, 440–455 and 544–551, Van Nostrand Reinhold, New York (Date Unknown).
Patent Abstract of Japan No. JP 40–95356 (Yasutaka) Mar. 27, 1992.

*Primary Examiner*—Olik Chaudhuri
*Assistant Examiner*—C. Everhart
*Attorney, Agent, or Firm*—Herbert L. Lerner; Laurence A. Greenberg

[57] ABSTRACT

A method for cathode-side water and inert gas disposal and/or anode-side inert gas disposal from a fuel cell block having a number of fuel cells, includes increasingly concentrating a water and an inert gas component in a cathode-side gas mixture and an inert gas component in an anode-side gas mixture, in flow direction of the gas mixtures. The water and inert gas components are at least partially discharged from the fuel cell block. In an apparatus for performing the method, the fuel cells are subdivided into cell groups through which a flow of gas mixtures can be conducted in parallel. The cell groups include a cell group disposed last as seen in gas mixture flow direction. Lines connect the cell groups for conducting at least a fraction of the gas mixtures successively through the cell groups, and for discharging another fraction of the gas mixtures, being dependent on an electric current, from the fuel cell block after flowing through the last cell group.

19 Claims, 4 Drawing Sheets

METHOD AND APPARATUS FOR DISPOSING OF WATER AND/OR INERT GAS FROM A FUEL CELL BLOCK

BACKGROUND OF THE INVENTION

1. Field of the Invention

The invention relates to a method and an apparatus for the cathode-side disposal of water and inert gas and/or the anode-side disposal of inert gas from a block having a number of fuel cells. A PEM fuel cell, where PEM is the abbreviation for polymer electrolyte membrane or proton exchange membrane, or an acidic or alkaline fuel cell, are possible fuel cell types in such a method and apparatus.

A fuel cell generally includes an electrically conductive current transformer plate, a cathode, an ion-conducting intermediate layer, an anode, and a further electrically conductive current transformer plate, which are stacked together in that order in the form of flat plates, and in which the anode, electrolyte and cathode form a membrane electrode unit (ME).

Fuel cells with such a construction are known, among other sources, from the Fuel Cell Handbook by Appelby and Foulkes, New York, 1989, and by the article by K. Strasser, entitled "Brennstoffzellen fur Electrotraktion" [Fuel Cells for Electric Traction], VDI Reports, No. 912, 1992, pp. 125–145, as well as German Published, Prosecuted Application DE-AS 27 29 640. Since the fuel cell is capable of converting chemically bound energy directly into electrical energy, it makes it possible for fuels such as hydrogen, natural gas and biogas to be converted into electrical energy at greater efficiency and with less environmental burden than the previously known conventional internal combustion engines, having an efficiency which is limited by the so-called Carnot process, were capable of doing.

A block of fuel cells is usually made up of alternatingly stacked together diaphragm-electrode units, gas chambers, cooling units and pressure cushions. Seals and possibly spacers are built in between those individual components. The various liquid and gas chambers of the block are supplied from axial channels through radial channels that extend through the seals. Such an axial channel extends at right angles to the plane of the stacked-together plate-like components of the fuel cell block. Such a radial channel extends correspondingly in the plane of the plates.

During operation of known fuel cell blocks, in particular with blocks formed of PEM fuel cells, the problem arises, for example, even when the anode side is supplied with industrially pure water and the cathode side is supplied with industrially pure oxygen, that water, which is created in the fuel cells as a result of the electrochemical reaction of hydrogen and oxygen, and inert gases such as nitrogen, carbon dioxide, and noble gases, are concentrated when supply gases are carried in circulation. Methods previously employed for disposing of the water and inert gas component or of the inert gas component from the cathode-side or anode-side gas mixture have been based on the cathode side on a superimposed oxygen circuit with a condenser, from which liquid water is continuously separated out. In the process, however, the inert gas is enriched continuously, causing the cell voltage and therefore the efficiency to drop. Even raising the flushing rate has no effect on the enrichment with inert gases, since it merely reduces the proportion of water. As the flushing rate increases, the increased capacity requirement for the condenser also markedly reduces the system efficiency. The flushing rate is the ratio between the discharged and the introduced volumetric flow of the anode-side or cathode-side gas mixture.

As the flushing rate increases, the capacity requirement of the condenser for humidified oxygen increases as well and thus decreases the efficiency. The aggressive media to be condensed, such as humidified, hot oxygen, which attack parts of the condenser, also increase the expense for maintenance as the condenser capacity increases. A problem which also exists is that in a fuel cell block that is integrated in a secure tank, the heat loss of the condenser must be dissipated. The relatively high noise level of the condenser must also be abated.

SUMMARY OF THE INVENTION

It is accordingly an object of the invention to provide a method and an apparatus for disposing of water and/or inert gas from a fuel cell block, which overcome the hereinaforementioned disadvantages of the heretofore-known methods and devices of this general type and which make it possible for a fuel cell block, particularly a block including PEM fuel cells, to be operated with virtually 100% fuel utilization at an efficiency that is constant over time, by suitable removal of the inert gases and/or product water.

With the foregoing and other objects in view there is provided, in accordance with the invention, a method for cathode-side water and inert gas disposal and/or anode-side inert gas disposal from a fuel cell block having a number of fuel cells, which comprises increasingly concentrating a water and an inert gas component in a cathode-side gas mixture in a flow direction of the gas mixture, and increasingly concentrating an inert gas component in an anode-side gas mixture in a flow direction of the gas mixture, in a fuel cell block having a number of fuel cells; and at least partially discharging the water and inert gas components from the fuel cell block.

Due to the concentration of the water and inert gas component, or the inert gas component, in the flow direction of the applicable gas mixture, the resultant capacity drop is limited to the fuel cells disposed last in the flow direction of the gas mixtures.

With the objects of the invention in view, there is also provided a fuel cell assembly, comprising a fuel cell block having an anode side for an anode-side gas mixture, a cathode side for a cathode-side gas mixture, and a number of fuel cells, the fuel cells being subdivided into cell groups through which a flow of gas mixtures can be conducted in parallel, the cell groups including a cell group disposed last as seen in the respective gas mixture flow direction, and lines connecting the cell groups for conducting at least a fraction of the gas mixtures successively through the cell groups, and for discharging another fraction of the respective gas mixtures, being dependent on an electric current, from the fuel cell block after flowing through the last cell group.

Since the fuel cells are divided into cell groups, the parallel flow through them is made homogeneous over all of the fuel cells within one cell group, which is advantageous for the sake of uniform onward passage of the water and/or inert gas component as well. Since at least a fraction of the gas mixtures successively flows through these cell groups, the water and/or inert gas component in the gas mixtures is concentrated in the flow direction of the gas mixtures. After leaving the last cell group in the flow path, a portion of the gas mixtures that is dependent on the electric current is discharged from the block and is replaced at the inlet to the fuel cell block, for instance by fresh oxygen or hydrogen gas. By measuring the electric current of this cell group, a suitably large quantity of water and inert gas, or inert gas, can be discharged from the fuel cell block and replaced with fresh, industrially pure oxygen or hydrogen gas. As a result, high total efficiency of the fuel cell block that remains constant is attained.

In accordance with another feature of the invention, in order to make the capacity of the fuel cell block uniform, the fuel cell block has contrary flows of the gas mixture through it on the cathode and anode sides. This makes it possible for the oxygen content of the cathode-side gas mixture which, for instance, decreases during the flow through the fuel cell block, or the decreasing water content of the gas mixture on the anode side, to be counteracted by a high concentration of fresh hydrogen or fresh oxygen.

In accordance with a further feature of the invention, for the sake of concentrating the water and inert gas component, or merely the inert gas component, in the cathode-side or anode-side gas mixture, the number of fuel cells with a parallel flow through them inside one cell group decreases in the flow direction of the cathode-side or anode-side gas mixture. As a result, a possible capacity drop also remains limited essentially to the last cell group in the flow direction, and if needed this cell group may have only a single fuel cell.

In accordance with an added feature of the invention, the cell groups are connected to one another in such a way that the entire anode-side or cathode-side gas mixture flows successively through these cell groups, a water separator is disposed in a line for the cathode-side gas mixture between two successive cell groups, and the gas mixture leaving the cell group disposed last in the flow direction of the gas mixture is discharged from the fuel cell block as a function of the electric current.

As a result, the fuel cells assembled into one cell group have a flow through them in parallel, the water and/or inert gas component concentrates increasingly from one cell group to the next, and the component can be discharged after leaving the cell group disposed last in the flow direction of the gas mixture, as a function of the electric current flowing through the fuel cell block. Moreover, this configuration of cell groups and of the lines that connect the cell groups makes it possible to dispense with a condenser for recirculating portions of the cathode-side gas mixture, because less fuel or oxygen or inert gas needs to be transported per cell group than in the embodiment that will be referred to next below.

In accordance with an additional feature of the invention, the fuel cell block is subdivided into at least two parallel cell groups, through each of which the flow is parallel, and the cathode-side gas mixture, on one hand after flowing through a cell group, partially with water separation, is recirculated into this same cell group, and on the other hand is partially introduced into the next cell group, wherein a fraction, dependent on the electric current of at least one fuel cell, of the gas mixture leaving the cell group disposed last in the flow direction of the gas mixture, is discharged. In this case the portion of the gas mixture that does not successively flow through the cell group is recirculated to the fuel cells again through a water separator and a condenser. This makes it possible for virtually all of the fuel cells of the fuel cell block to be combined into one cell group. The concluding increasing concentration of the inert gas component is limited to the few fuel cells located last in the flow direction. This has a favorable effect on regulating the expulsion of inert gas, since the sensitivity of regulation, which is dependent, for instance, on current, is increased.

In accordance with yet another feature of the invention, an advantageous current-dependent regulation is attained if a fraction, dependent on an electric current, of the anode-side cell block, wherein $I_s$ is the current flowing through one of and cathode-side gas mixture, is discharged from the fuel two electrically parallel-connected fuel cells, wherein these two fuel cells are disposed last in the fuel cell block in the flow direction of at least one of the two gas mixtures, and wherein the fuel (for example $H_2$) and the oxidant (for example $O_2$) are delivered in a mutually stoichiometric ratio. In this case the current $I_s$ may also be referred to the current I flowing through the fuel cell block. The ratio of $I_s/I$ is then a simple regulating parameter, and then a portion of the cathode-side and anode-side gas mixture necessary for maintaining efficiency is discharged continuously or discontinuously from the fuel cell block after a command value for $I_s/I$ is exceeded.

In accordance with yet a further feature of the invention, in order to provide particularly good utilization of the oxygen or hydrogen content in the cathode-side or anode-side gas mixture, and in order to regulate the gas mixture quantity discharged from the fuel cell block, with contrary passage of the anode-side and cathode-side gas mixtures, an anode-side or cathode-side gas mixture is discharged from the block of n fuel cells, if $2 I_H/I \geq 0.70$ and $2I_O/I \geq 0.60$, respectively, wherein I is the current flowing through the total fuel cell block, $I_H$ is the current flowing through one of two electrically parallel-connected fuel cells, which together form the last fuel cell of the block through which the anode-side gas mixture flows, and $I_O$ is the current flowing through one of two electrically parallel-connected fuel cells, which together form the last fuel cell of the block through which the cathode-side gas mixture flows. Through the use of this method and device, it is then possible, separately from one another, to define an excessive or overly scant supply of fuel gas or oxidant to the fuel cells. This makes it possible to measure the adherence to the stoichiometric ratio with measuring instruments.

In accordance with yet an added feature of the invention, in order to provide particularly uniform removal of the water from the cathode-side gas mixture, there are provided hydrophilic inserts in radial conduits that are used to dispose of the anode-side or cathode-side gas mixture. As a result, despite there being a mixture of water and gas as a flow medium, a readily replicable throttle resistance and therefore uniform disposal are attained.

In accordance with a concomitant feature of the invention, in order to recirculate the water separated in the disposal process and therefore to save fresh water, the separated water is delivered to a humidifier for humidifying the gas mixtures flowing into the fuel cells.

Other features which are considered as characteristic for the invention are set forth in the appended claims.

Although the invention is illustrated and described herein as embodied in a method and an apparatus for disposing of water and/or inert gas from a fuel cell block, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
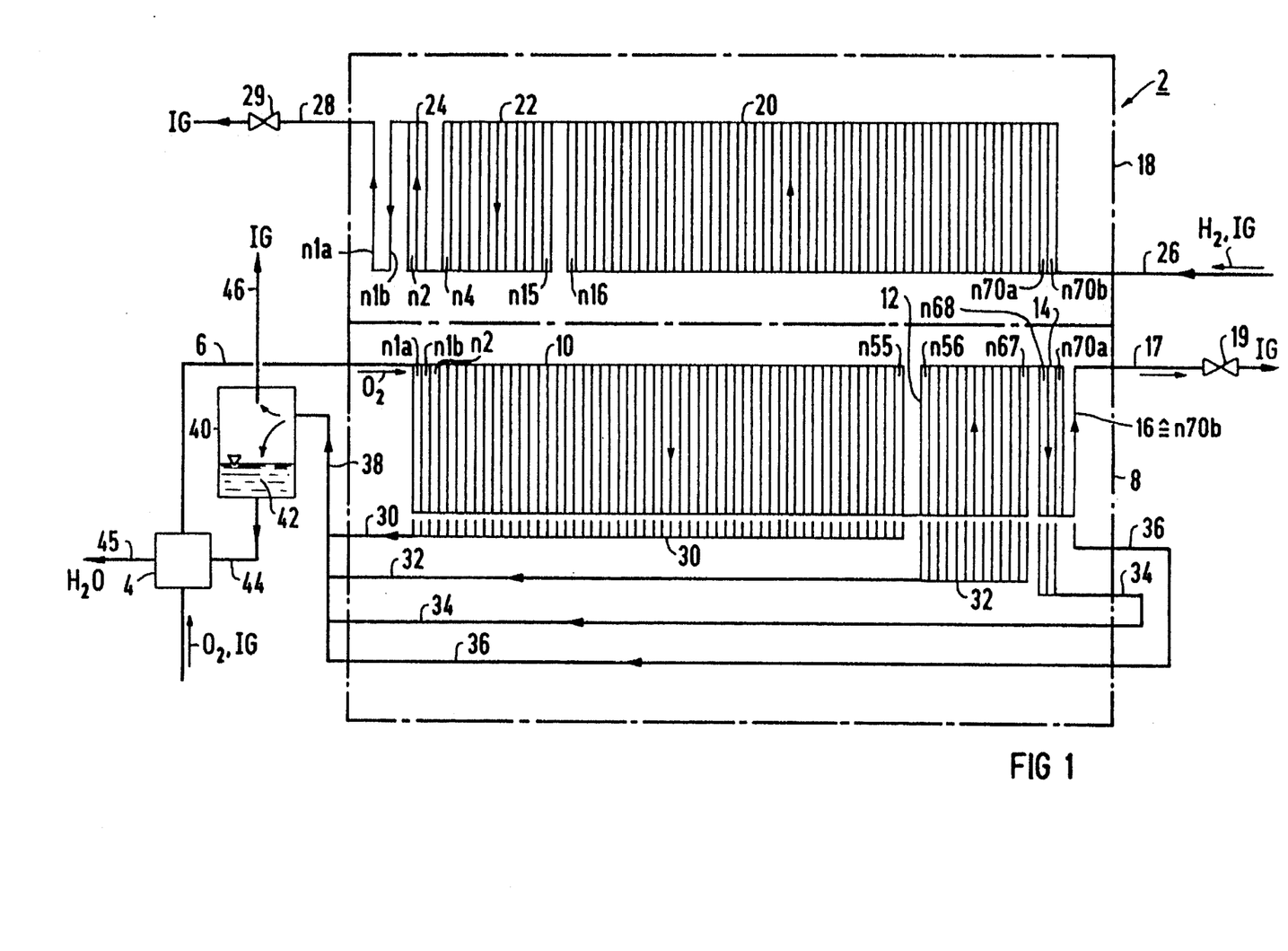
FIG. 1 is a basic diagrammatic and schematic circuit diagram of a cathode-side disposal of water and inert gas and an anode-side disposal of inert gas from a fuel cell block, in accordance with a first disposal concept.
Figure 2:
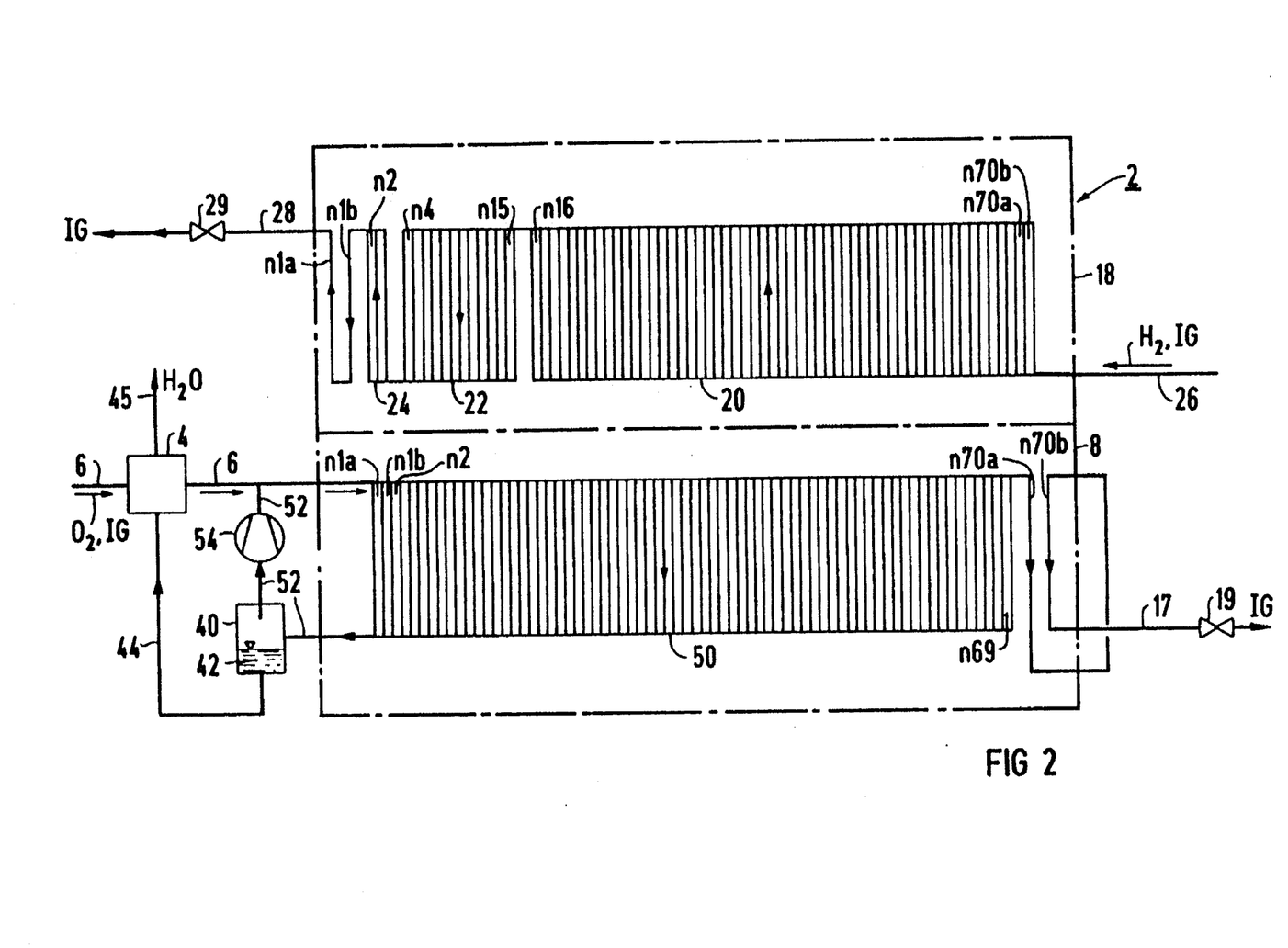
FIG. 2 is a basic diagrammatic and schematic circuit diagram of the disposal of water and inert gas from the cathode side and of inert gas from the anode side of a fuel cell block, according to a second disposal concept.
Figure 3:
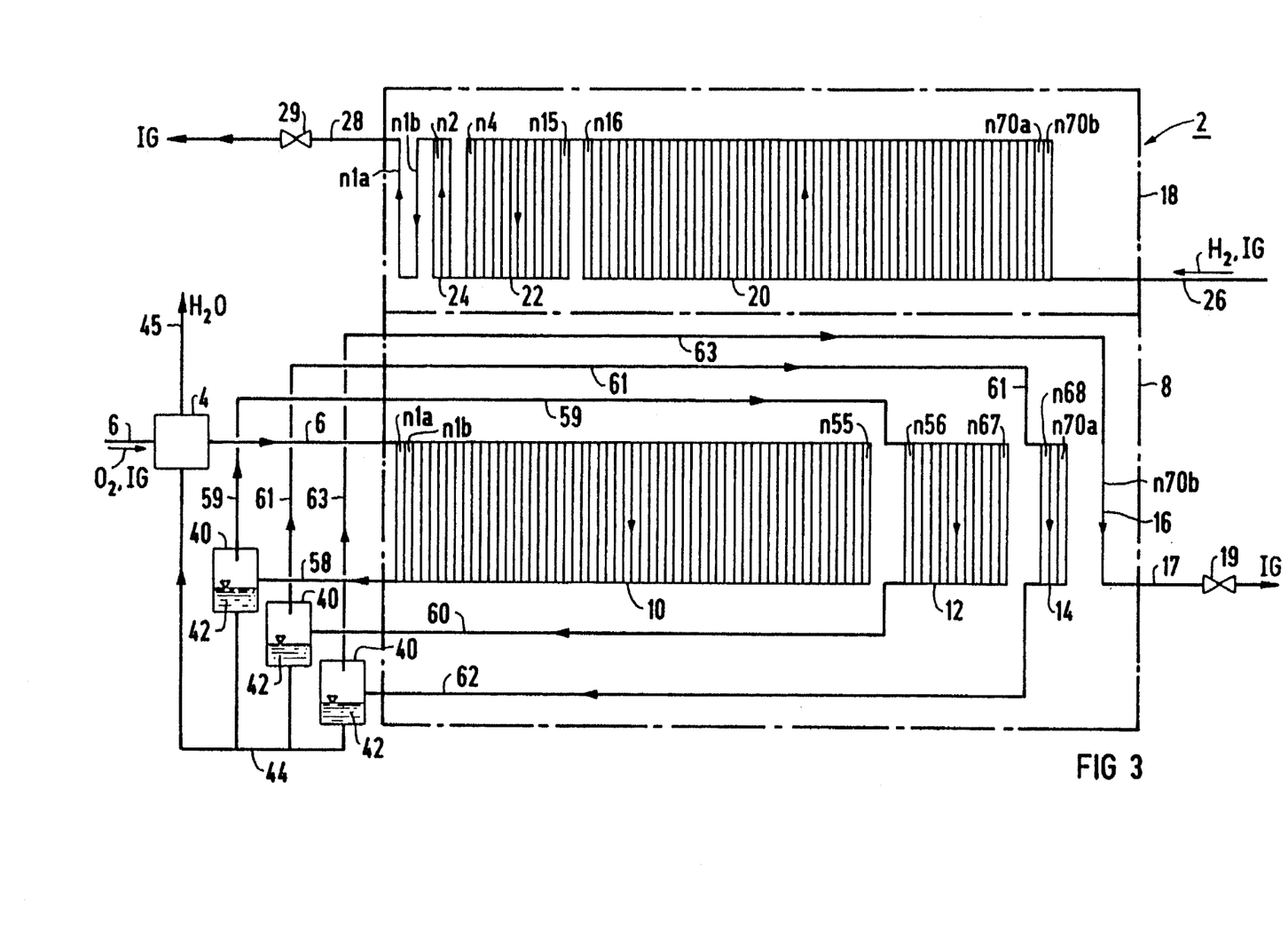
FIG. 3 is a basic diagrammatic and schematic circuit diagram of the disposal of water and inert gas from the cathode side and of inert gas from the anode side of a fuel cell block, according to a third disposal concept.

Referring now in detail to the figures of the drawing, in which identical elements are identified by the same reference numerals, and first, particularly, to FIG. 1 thereof, there is seen a basic layout of a cathode-side disposal of water and inert gas and an anode-side disposal of inert gas from a fuel cell block 2 according to a first disposal concept. The fuel cell block 2 is made up of 72 diagrammatically shown fuel cells n1a, n1b, n2, n3, ..., n68, n69, n70a, n70b. For easier comprehension, both FIG. 1 and FIGS. 2 and 3 show cathode-side gas chambers of the fuel cells n1a–n70b below anode-side gas chambers of the same fuel cells n1a–n70b.

A cathode side 8 of the fuel cell block 2 is divided in flow direction of a cathode-side gas mixture $O_2$, IG first into a cell group 10, in which the flow through the fuel cells n1a–n55 is parallel, with the fuel cells n1a and n1b being connected electrically in parallel and the others being connected electrically in series with them. A following cell group 12 has the fuel cells n56–n67, through which the flow is parallel and which are connected electrically in series. The cell group 12 is adjoined by cell groups 14, 16. The cell group 14 has three fuel cells n68–n70a through which the flow is parallel, and the cell group 16 has only the fuel cell n70b. The fuel cells n68 and n69 of the cell group 14 are connected electrically in series. The fuel cell n70a is connected electrically parallel to the fuel cell n70b. This electric connection of the fuel cells n1a–n70b can be seen in FIG. 4.

On an anode side 18 of the fuel cell block 2, the electric connection of the fuel cells n1a, n1b, n2, n3, ... n68, n69, n70a, n70b is naturally identical. In this case the fuel cells through which there is a parallel flow of an anode-side gas mixture $H_2$, IG are fuel cells n16–n70b in a first cell group 20, fuel cells n4–n15 in a second cell group 22, and fuel cells n2, n3 in a third cell group 24. There is a successive flow through the cell groups 20, 22, 24 in that order. The fuel cells n1b and n1a adjoin them successively. During operation of the fuel cell block 2, the cathode-side gas mixture, which in this case is oxygen gas $O_2$ with an inert gas component IG, flows through a moistener 4 and an oxygen delivery line 6 into the fuel cell block 2. The oxygen content of the gas mixture flowing into the fuel cell block 2 on the cathode side through the oxygen delivery line 6 is on the order of 99.5 volume %.

The remaining 0.5 volume % includes gaseous contaminants that are typically present in industrially pure gases, such as nitrogen, carbon dioxide and noble gases. With respect to the electrochemical reaction in the fuel cells n1a–n70b, these contaminants behave in inert fashion. The cathode-side gas mixture then flows through the cell groups 10–16 that are connected in series on the gas side, and leaves the fuel cell block 2 through a residual gas disposal line 17 with a valve 19, which in this case is regulatable. The anode-side gas mixture, which in this case is industrially pure hydrogen gas $H_2$ with a proportion of approximately 0.05 volume % of contaminants and is referred to below as the inert gas component IG, is fed through a water delivery line 26 into the cell group 20, flows through the cell groups 22, 24 that are connected in series with it on the gas side, and also flows through the fuel cells n1a and n1b and leaves the anode side 18 through a further residual gas disposal line 28, which has a valve 29 that in this case is again regulatable.

On the cathode side 8, the individual fuel cells n1a–n55 of the cell group 10 are connected to a water disposal line 30; the individual fuel cells of the cell group 12 are connected to a water disposal line 32; the individual fuel cells of the cell group 14 are connected to a water disposal line 34, and the fuel cell n70b is connected to a water disposal line 36. All of these lines 30, 32, 34, 36 discharge into a collecting line 38. The line 38 in turn discharges into a water separator 40. Water 42 that is separated in the water separator 40 is fed into the humidifier 4 through a line 44 and there is utilized to humidify the cathode-side gas mixture flowing into the fuel cell block 2, which in this case is industrially pure oxygen $O_2$. The excess water leaves through a residual water line 45. The gaseous components introduced into the water separator 40 with the water 42, such as nitrogen, carbon dioxide and noble gases, emerge as inert gas IG through a vent line 46.

After connection of an electrical load to the fuel cell block 2, the gas mixture introduced on the cathode side 8, which in this case is 99.5 volume % of oxygen, is converted at the cathodes of the fuel cells n1a–n70b into doubly negatively charged oxygen ions $O^{2-}$. The electrons required for this are liberated in the anodes of the fuel cells n1a–n70b, in which the industrially pure hydrogen gas $H_2$ introduced into the anode side 18 is converted into hydrogen ions $H^+$ and flow through the external electric load to the cathodes of the fuel cells n1a–n70b, although this is not shown in detail in this case. The hydrogen ions migrate through a PEM, which is not shown herein, to a PEM cathode boundary layer, where they recombine with the oxygen ions, forming water. As a result of this electrochemical conversion, the oxygen content in the cathode-side gas mixture, or the water-content in the anode-side gas mixture, increases as it passes through each fuel cell. Therefore, the concentration of the inert gas component IG, such as noble gases, rises on the anode side 18, and the inert gas and water component increase on the cathode side 8.

Figure 4:
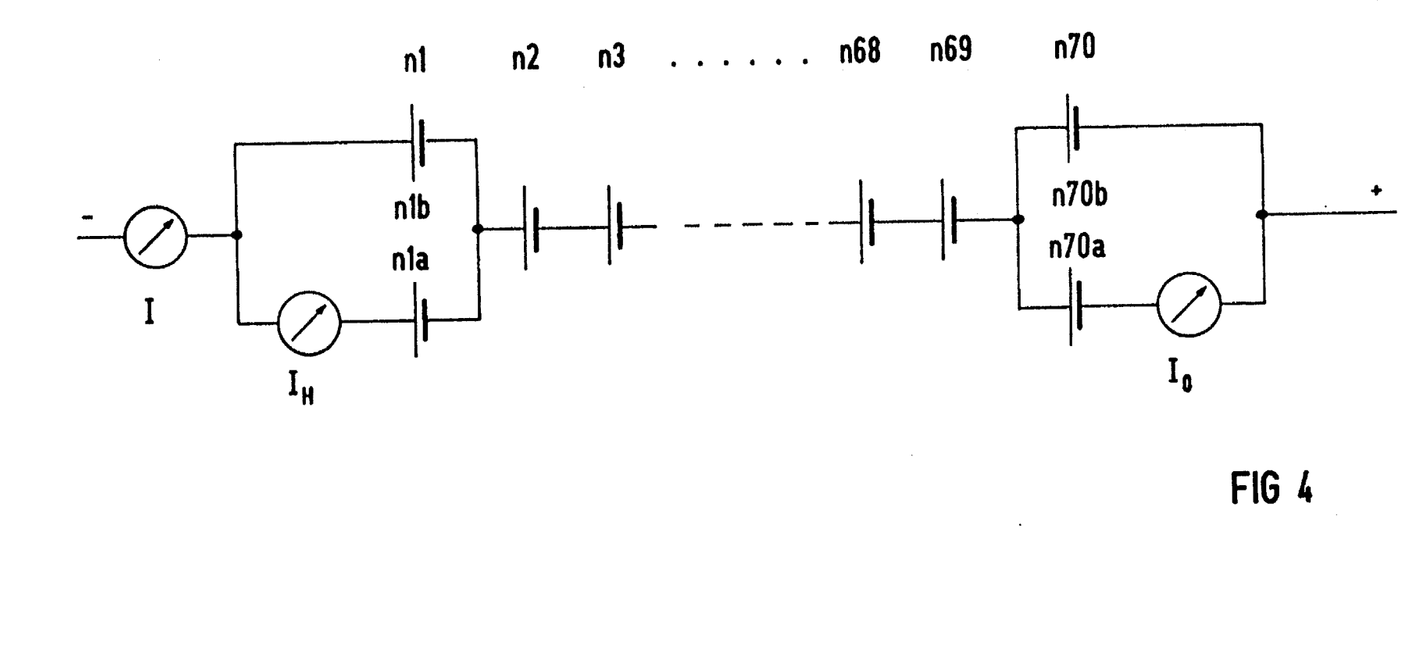
FIG. 4 is a basic schematic circuit diagram of an electric connection of the fuel cells.

By arranging the fuel cells n1a–n70b in cell groups 10–16, 20–24 through which the flow is successive, and since each includes fuel cells through which the flow is parallel, the inert gas component in the anode-side gas mixture, or the water and inert gas component in the cathode-side gas mixture, is concentrated increasingly from one cell group to the next. On the cathode side 8, the water is removed from the cathode chambers of the cathode cells n1a–n70b by gravity, which is reinforced by the flow direction of the gas mixture. Through the use of the current-dependent-adjustable valves 19, 29, a sufficiently large quantity of inert gas to maintain the overall efficiency of the fuel cell block 2 is discharged in each case. In the exemplary embodiment, the value of $2\,I_H/I \geq 0.95$ is established through the anode-side valve 29. In this case I is the total current flowing through the fuel cell block 2; and $I_H$ is the current flowing through one of the two electrically parallel-connected fuel cells n1a and n1b, as is seen in FIG. 4. With the cathode-side valve 19, the value of $2\,I_O/I \geq 0.80$ is established. $I_O$ is the current flowing through one of the two electrically parallel-connected fuel cells n70a and n70b, as is seen in FIG. 4.

FIG. 2 shows a second disposal concept in terms of a basic circuit diagram for water and inert gas disposal from the fuel cell block 2. The entire structure of the fuel cell block 2 on the anode side 18 remains unchanged from FIG. 1. Once again, 70 fuel cells n1–n70 are connected electrically in series in the fuel cell block 2. The fuel cells n1a and n1b are connected electrically parallel to one another, as are the fuel cells n70a and n70b.

On the cathode side 8, the fuel cells n1a–n70b are divided in cell groups differently than in FIG. 1. The fuel cells n1a–n69 in FIG. 2 are combined into a cell group 50 in which a flow through them is parallel. The fuel cell n70a adjoins them on its inlet side parallel to them, and the fuel cell n70b adjoins the latter in series with it. Connected to the cell group 50 is a recirculation line 52. The cathode-side gas mixture leaving the fuel cells n1a–n69 is recirculated through the recirculation line 52, through the water separator 40 and a condenser 54, into the oxygen delivery line 6.

During operation of the fuel cell block 2, the cathode-side gas mixture, which in this case is oxygen $O_2$ with an inert gas component IG, flows through the oxygen delivery line 6 first into the humidifier 4 and from there into the cell group 50 and the fuel n70a. In this way it is again assured that in operation of the fuel cell block 2, the inert gas component on the anode side 18 is concentrated in the fuel cells n1a and n1b that are disposed last in the flow direction of the anode-side gas mixture, and is discharged through the residual gas disposal line 28 and the regulatable valve 29. Through the parallel connection on the inlet side of the fuel cells n1a–n69 to the fuel cell n70a, due to the fuel cell n70b that is connected in series with the latter, and due to the partial recirculation of the cathode-side gas mixture, on the cathode side 8 the inert gas component IG is also concentrated in the fuel cells n70a and n70b that are disposed last in the flow direction of the cathode-side gas mixture. From there, the inert gas IG is discharged through the residual gas disposal line 17 and the regulatable valve 19.

The product water 42 produced in the electrochemical reaction of the oxygen and hydrogen is separated in the water separator 40 from the gas mixture to be recirculated and is carried into the humidifier 4 through the line 44. Excess water 42 can be emitted to the environment from the humidifier 4, through a residual water line 45. The valves 19, 29 are regulated in the same way as is described for the disposal concept 1 of FIG. 1. In this disposal concept, the flushing rate can be arbitrarily chosen. However, this is a question of the condenser capacity. The flushing rate is the ratio of the volumetric flow of the cathode-side and/or anode-side gas mixture discharged from the block 2 to that introduced into the block 2.

FIG. 3 shows a basic diagram of the water and inert gas disposal of the fuel cell block 2 according to the third disposal concept. The structure of the fuel cell block 2 on the anode side 18 is the same as in FIGS. 1 and 2. The electrical connection of the fuel cells n1a–n70b is also unchanged. On the cathode side, the fuel cells n1a–n70b are again subdivided into the cell groups 10, 12, 14, 16, in the manner already shown in FIG. 1.

On the anode side 18, the inert gas IG in the cathode-side mixture is enriched, as was already described in conjunction with FIGS. 1 and 2, in the fuel cells n1a, n1b that are disposed last in the flow direction of the gas mixture and, after the already introduced regulation of the valve 29, is discharged through the residual gas disposal line 28.

On the cathode side 8, the cathode-side gas mixture, which in this case is oxygen $O_2$ with an inert gas component IG, flows through the oxygen delivery line 6 first into the humidifier 4 and from there through the oxygen delivery line 6 to the first cell group 10. There, the flow through the fuel cells n1a–n55 is parallel. The cathode-side gas mixture emerging from the first cell group 10 and already having an inert gas and water component is introduced from a discharge line 58 and flows through the water separator 40 and a delivery line 59 on the inlet side into the second cell group 12. In this case, the cathode-side gas mixture flows in parallel through the fuel cells n56–n67. As a result of the electrochemical reaction to the oxygen in the cathode-side gas mixture during the flow through the fuel cells n56–n67, the inert gas component increases further. The gas mixture emerging from the fuel cells n56–n67 is likewise delivered through a further discharge line 60 to a structurally identical water separator 40, and from there through a further delivery line 61 into the third cell group 14. In the third cell group 14, the flow through the fuel cells n68–n70a is parallel. After a further increase in concentration of the inert gas component IG, the cathode-side gas mixture is then delivered through another discharge line 62 to another structurally identical water separator 40, and from there through another recirculation line 63 into the fuel cell n70b that is disposed last. The water 42 that is separated out in the three water separators 40 is introduced through the lines 44 into the humidifier 4, where it is used to humidify the cathode-side gas mixture. Excess water $H_2O$ is output to the environment through the residual water line 45.

The cathode-side gas mixture flowing into the last cell group n70b in the flow direction is discharged from the fuel cell block 2 through the residual gas disposal line 17 and the regulatable valve 19. The regulation of the valves 19, 29 in this case is the same as has already been described in conjunction with FIGS. 1 and 2.

As compared with the disposal concept of FIG. 2, in the third disposal concept shown in FIG. 3 it is fundamentally possible to dispense with a separate condenser 54, if the flushing rate is sufficiently slight.

In principle, all of the fuel cells n1a–n70b shown in FIGS. 1–3 are supplied and drained through axial and radial conduits. An axial conduit extends perpendicularly to the plane of the plates in the stacked configuration of the plate-like fuel cells n1a–n70b. A radial conduit extends correspondingly in that plane. In order to reinforce the separation of water from the cathode-side gas mixture and to make the flow through the cell groups 10–16 homogeneous, hydrophilic inserts are provided in the radial disposal conduits of the fuel cells for the cathode-side gas mixture. The term hydrophilic inserts is understood to mean wick-like inserts, which have a readily replicable throttle resistance and therefore enable uniform disposal, despite a flow medium in the form of a mixture of liquid water and gas.

Moreover, the disposal concept used on the cathode side 8 as is illustrated by FIG. 3 can also be employed on the anode side 18 if liquid water is to be separated there. This is the case, for instance, if the fuel cell block is formed not of PEM fuel cells but rather of alkaline or acidic fuel cells.

The precise way in which the fuel cells are divided up into cell groups with fuel cells that have a flow parallel through them depends greatly on the increase of inert uncoverable gases IG, such as water vapor, nitrogen, carbon dioxide and noble gases, in the inflowing gas mixture. If the fuel cells are subdivided more severely into series-connected cell groups, then a lesser inert gas component IG is entrained in the first cell groups than during a recirculation of this gas mixture into these cell groups after water separation. As a result, in the downstream cell groups, the proportion of reactants ($O_2$, $H_2$) is less, with a simultaneously higher inert gas component IG. The gas throughput is therefore less, and it is easier to dispense with an additional gas condenser.

I claim:

1. A method for cathode-side water and inert gas disposal and anode-side inert gas disposal from a fuel cell block having a number of fuel cells, which comprises increasingly concentrating a water and an inert gas component in a cathode-side gas mixture in a flow direction of the gas mixture, and increasingly concentrating an inert gas component in an anode-side gas mixture in a flow direction of the gas mixture, in a fuel cell block having a number of fuel cells; and at least partially discharging the water and inert gas components from the fuel cell block.

2. The method according to claim 1, which comprises discharging from the fuel cell block a portion of the applicable gas mixture being dependent on an electric current of at least one of the fuel cells, for regulated disposal of at least one of water and inert gas.

3. The method according to claim 1, which comprises at least partially recirculating the cathode-side gas mixture into the fuel cell block, with water being separated in the process.

4. The method according to claim 1, which comprises directing the flow of the anode-side and the cathode-side gas mixtures through the fuel cell block in opposite directions.

5. The method according to claim 1, which comprises subdividing the fuel cell block into at least two cell groups through each of which the flow is parallel, increasing the concentration of the water and the inert gas component in the cathode-side gas mixture, and increasing the concentration of the inert gas component in the anode-side gas mixture, by a successive flow through the cell groups, withdrawing water from the cathode-side gas mixture before it enters the next cell group, and discharging the gas mixture from the fuel cell block as it leaves the last cell group, as seen in the flow direction of the gas mixture.

6. The method according to claim 1, which comprises subdividing the fuel cell block into at least two parallel cell groups through each of which the flow is parallel, partially recirculating the cathode-side gas mixture after flowing through a cell group with water separation, into the same cell group, and partially introducing the cathode-side gas mixture into the next cell group, and discharging a fraction of the gas mixture leaving the cell group disposed last, as seen in the flow direction of the gas mixture, in dependence on the electric current of at least one fuel cell.

7. The method according to claim 1, which comprises carrying out water separation in cathode chambers of the fuel cells.

8. The method according to claim 1, which comprises discharging the water from the gas flow from cathode chambers of the fuel cells, and separating the water outside the fuel cells.

9. The method according to claim 1, which comprises humidifying the gas mixtures flowing into the fuel cells with separated water.

10. The method according to claim 1, which comprises discharging a fraction of the anode-side and the cathode-side gas mixture from the fuel cell block, in dependence on an electric current, wherein the current is a current flowing through one of two electrically parallel-connected fuel cells, and the two fuel cells are disposed last in the fuel cell block, as seen in the flow direction of at least one of the two gas mixture, and delivering fuel and oxidant in a mutually stoichiometric ratio.

11. The method according to claim 1, which comprises directing the anode-side and the cathode-side gas mixtures in opposite directions through the fuel cell block, and discharging the anode-side or the cathode-side gas mixture from n fuel cells from the fuel cell block, if $2I_H/I \geq 0.70$ and $2I_O/I \geq 0.60$, wherein I is the current flowing through the total fuel cell block, $I_H$ is the current flowing through one of two electrically parallel-connected fuel cells which together form the last fuel cell of the block through which the anode-side gas mixture flows, and $I_O$ is the current flowing through one of two electrically parallel-connected fuel cells which together form the last fuel cell of the block through which the cathode-side gas mixture flows.

12. A fuel cell assembly, comprising:

a fuel cell block having an anode side for an anode-side gas mixture, a cathode side for a cathode-side gas mixture, and a number of fuel cells, said fuel cells being subdivided into cell groups through which a flow of gas mixtures can be conducted in parallel, said cell groups including a cell group disposed last as seen in gas mixture flow direction, and lines connecting said cell groups for conducting at least a fraction of the gas mixtures successively through said cell groups, and for discharging another fraction of the gas mixtures, being dependent on an electric current, from said fuel cell block after flowing through said last cell group.

13. The assembly according to claim 12, wherein the number of said fuel cells through which a parallel flow occurs within one of said cell groups decreases as seen in the flow direction of the anode-side gas mixture and in the flow direction of the cathode-side gas mixture.

14. The assembly according to claim 12, wherein said lines connect said cell groups to one another for conducting the entire anode-side gas mixture successively through said cell groups on said anode side, and for conducting the entire cathode-side gas mixture successively through said cell groups on said cathode side, including a water separator connected in one of said lines conducting the cathode-side gas mixture between two successive cell groups, and the gas mixture leaving said last cell group can be discharged from said fuel cell block as a function of the electric current.

15. The assembly according to claim 12, including water disposal lines connected to said cell groups on said cathode side, and a common water separator into which each of said water disposal lines discharges for water disposal purposes.

16. The assembly according to claim 12, including a water separator and a condenser, said cell groups on said cathode side include a first cell group having an inlet side, and said lines connected to said cell groups on said cathode side discharge through said water separator and said condenser into the inlet side of said first cell group for water and inert gas disposal, except for said line connected to said last cell group.

17. The assembly according to claim 12, wherein said fuel cells have plates and radial conduits extending in a plane of said plates for disposal of the anode-side and the cathode-side gas mixtures, and including hydrophilic inserts built into said radial conduits as a throttle resistance.

18. The assembly according to claim 12, including a humidifier receiving separated water for humidifying the gas mixtures flowing into said fuel cell block.

19. A fuel cell assembly, comprising:

a fuel cell block having an anode side for an anode-side gas mixture, a cathode side for a cathode-side gas mixture, and a number of fuel cells, for cathode-side water and inert gas disposal and anode-side inert gas disposal from said fuel cell block, said fuel cells being subdivided into cell groups through which a flow of the gas mixtures can be conducted in parallel, said cell groups including a cell group disposed last as seen in gas mixture flow direction, and lines connecting said cell groups, said lines conducting at least a fraction of the gas mixtures successively through said cell groups, while increasingly concentrating a water and an inert gas component in the cathode-side gas mixture in the flow direction of the gas mixture, and increasingly concentrating an inert gas component in the anode-side gas mixture in the flow direction of the gas mixture, and said lines discharging another fraction of the gas mixtures, being dependent on an electric current, from said fuel cell block after flowing through said last cell group, while at least partially discharging the water and inert gas components from said fuel cell block.

* * * * *